(12) United States Patent
Kondoh et al.

(10) Patent No.: US 11,321,898 B2
(45) Date of Patent: May 3, 2022

(54) ANIMATION PRODUCTION SYSTEM

(71) Applicant: AniCast RM Inc., Minato-ku (JP)

(72) Inventors: Yoshihito Kondoh, Chuo-ku (JP); Masato Murohashi, Tokyo (JP)

(73) Assignee: AniCast RM Inc., Minato-ku (JP)

(*) Notice: Subject to any disclaimer, the term of this patent is extended or adjusted under 35 U.S.C. 154(b) by 0 days.

(21) Appl. No.: 17/008,117

(22) Filed: Aug. 31, 2020

(65) Prior Publication Data
US 2022/0036627 A1 Feb. 3, 2022

(30) Foreign Application Priority Data

Jul. 29, 2020 (JP) .............................. JP2020-128298

(51) Int. Cl.
*G06T 13/80* (2011.01)
*G06T 11/00* (2006.01)
*G06T 13/40* (2011.01)

(52) U.S. Cl.
CPC .............. *G06T 13/80* (2013.01); *G06T 11/00* (2013.01); *G06T 13/40* (2013.01); *G06T 2200/24* (2013.01)

(58) Field of Classification Search
CPC ......... G06T 13/80; G06T 13/40; G06T 11/00; G06T 2200/24
See application file for complete search history.

(56) References Cited

U.S. PATENT DOCUMENTS

| | | | | |
|---|---|---|---|---|
| 10,551,993 | B1* | 2/2020 | Sanocki | G06F 3/017 |
| 2012/0021828 | A1* | 1/2012 | Raitt | A63F 13/497 |
| | | | | 463/31 |
| 2017/0329503 | A1* | 11/2017 | Tilton | G11B 27/031 |
| 2018/0373413 | A1* | 12/2018 | Sawaki | H04N 13/332 |
| 2019/0107927 | A1* | 4/2019 | Schriber | G06F 16/34 |

FOREIGN PATENT DOCUMENTS

JP 2017146651 A 8/2017

* cited by examiner

Primary Examiner — Michael Le

(57) ABSTRACT

To enables you to take animations in a virtual space, an animation production method for providing a virtual space in which a given object is placed, the method comprising: detecting an action of a user equipped with a head mounted display; controlling a movement of an object based on the action of the detected user; shooting the movement of the object; and storing action data relating to the movement of the shot object in a predetermined track; accepting an editing request for the predetermined track; accepting specified time range of the predetermined track for editing; and performing the editing at the specified time range.

2 Claims, 9 Drawing Sheets

ANIMATION PRODUCTION SYSTEM

TECHNICAL FIELD

The present invention relates to an animation production system.

BACKGROUND ART

Virtual cameras are arranged in a virtual space (see Patent Document 1).

CITATION LIST

Patent Literature

[PTL 1] Patent Application Publication No. 2017-146651

SUMMARY OF INVENTION

Technical Problem

No attempt was made to capture animations in the virtual space.

The present invention has been made in view of such a background, and is intended to provide a technology capable of capturing animations in a virtual space.

Solution to Problem

The principal invention for solving the above-described problem is an animation production method for providing a virtual space in which a given object is placed, the method comprising: detecting an action of a user equipped with a head mounted display; controlling a movement of an object based on the action of the detected user; shooting the movement of the object; and storing action data relating to the movement of the shot object in a predetermined track; accepting an editing request for the predetermined track; accepting specified time range of the predetermined track for editing; and performing the editing at the specified time range.

The other problems disclosed in the present application and the method for solving them are clarified in the sections and drawings of the embodiments of the invention.

Advantageous Effects of Invention

According to the present invention, animations can be captured in a virtual space.

DESCRIPTION OF EMBODIMENTS

Figure 1:
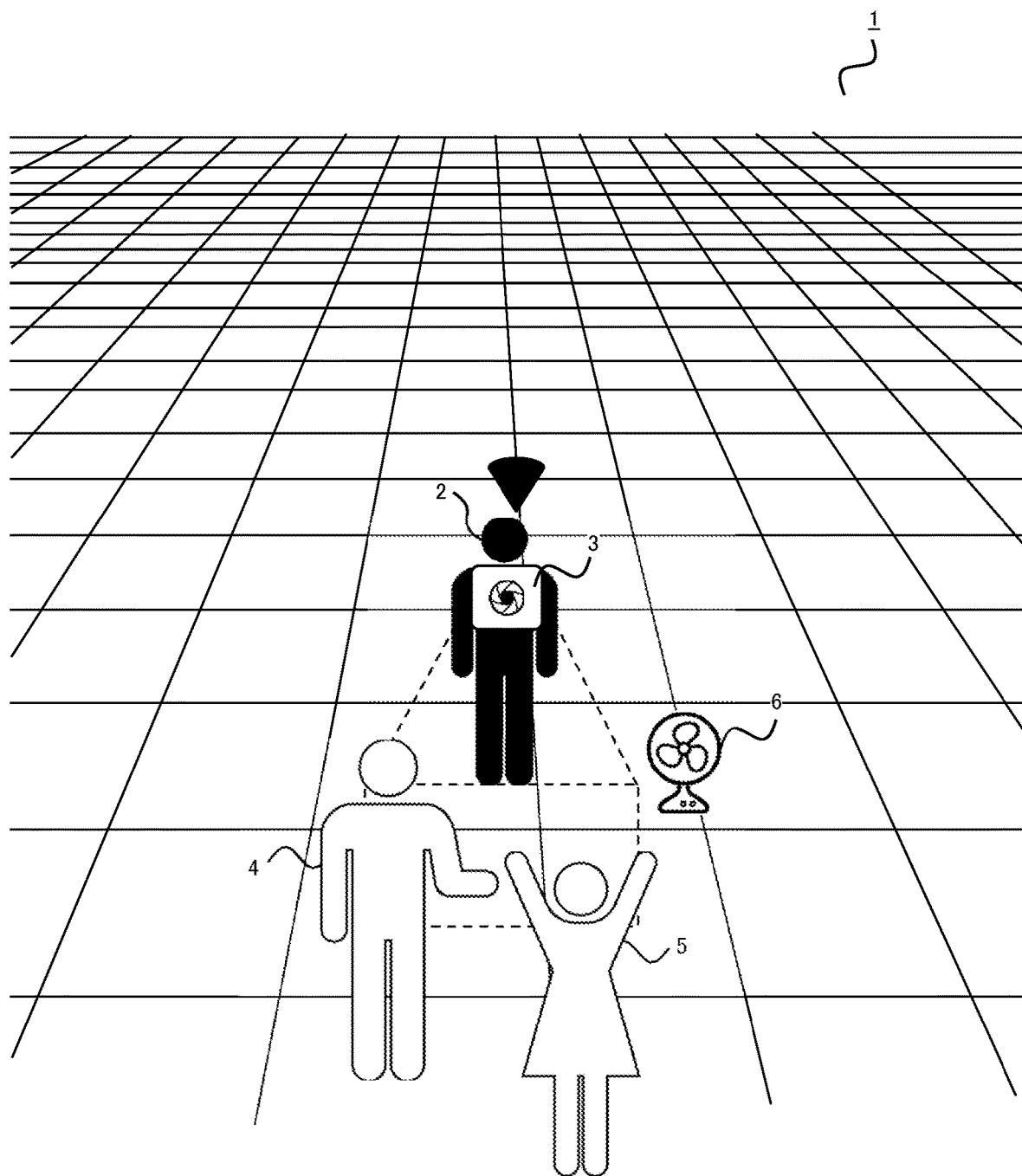
FIG. 1 is a diagram illustrating an example of a virtual space displayed on a head mount display (HMD) mounted by a user in an animation production system of the present embodiment.

The contents of embodiments of the present invention will be described with reference. An animation production method according to an embodiment of the present invention has the following configuration.

Item 1

An animation production method for providing a virtual space in which a given object is placed, the method comprising:
detecting an action of a user equipped with a head mounted display;
controlling a movement of an object based on the action of the detected user;
shooting the movement of the object; and
storing action data relating to the movement of the shot object in a predetermined track;
accepting an editing request for the predetermined track;
p accepting specified time range of the predetermined track for editing; and
performing the editing at the specified time range.

Item 1

The method according to claim 1, wherein
performing the editing includes:
detecting the action of the user equipped with the head mounted display;
controlling the movement of the object based on the detected action of the user;
shooting the movement of the object; and
storing the action data relating to the shot movement of the object in the specified time range of the predetermined track.

Item 2

The method according to claim 1, wherein
the object is a first character,
the track is a first track,
the method further comprising:
detecting a second action of the user mounting the head mounted display;
controlling a movement of a second character based on the detected second action of the user;
shooting a movement of the second object; and
storing action data of the second character in a second track, wherein the virtual space comprises images relating to movement of the character corresponding to the action data stored in the first track and the second track respectively.

A specific example of an animation production system according to an embodiment of the present invention will be described below with reference to the drawings. It should be noted that the present invention is not limited to these examples, and is intended to include all modifications within the meaning and scope of equivalence with the appended claims, as indicated by the appended claims. In the following description, the same elements are denoted by the same reference numerals in the description of the drawings and overlapping descriptions are omitted.

Overview

FIG. 1 is a diagram illustrating an example of a virtual space displayed on a head mount display (HMD) mounted by a user in an animation production system of the present embodiment. In the animation production system of the present embodiment, a character 4 and a camera 3 are disposed in the virtual space 1, and a character 4 is shot using the camera 3. In the virtual space 1, the photographer 2 is disposed, and the camera 3 is virtually operated by the photographer 2. In the animation production system of the present embodiment, as shown in FIG. 1, a user makes an animation by placing a character 4 and a camera 3 while viewing the virtual space 1 from a bird's perspective with a TPV (Third Person's View), taking a character 4 with an FPV (First Person View; first person support) as a photographer 2, and performing a character 4 with an FPV. In the virtual space 1, a plurality of characters (in the example shown in FIG. 1, a character 4 and a character 5) can be disposed, and the user can perform the performance while possessing a character 4 and a character 5, respectively. That is, in the animation production system of the present embodiment, one can play a number of roles (roles). In addition, since the camera 2 can be virtually operated as the photographer 2, natural camera work can be realized and the representation of the movie to be shot can be enriched.

General Configuration

Figure 2:
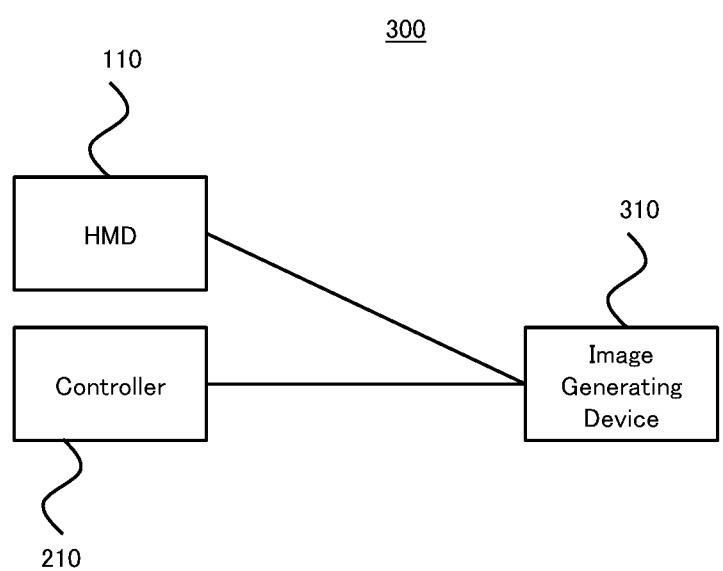
FIG. 2 is a diagram illustrating an example of the overall configuration of an animation production system 300 according to an embodiment of the present invention.

FIG. 2 is a diagram illustrating an example of the overall configuration of an animation production system 300 according to an embodiment of the present invention. The animation production system 300 may comprise, for example, an HMD 110, a controller 210, and an image generating device 310 that functions as a host computer. An infrared camera (not shown) or the like can also be added to the animation production system 300 for detecting the position, orientation and slope of the HMD 110 or controller 210. These devices may be connected to each other by wired or wireless means. For example, each device may be equipped with a USB port to establish communication by cable connection, or communication may be established by wired or wireless, such as HDMI, wired LAN, infrared, Bluetooth™, WiFi™. The image generating device 310 may be a PC, a game machine, a portable communication terminal, or any other device having a calculation processing function.

HMD 110

Figure 3:
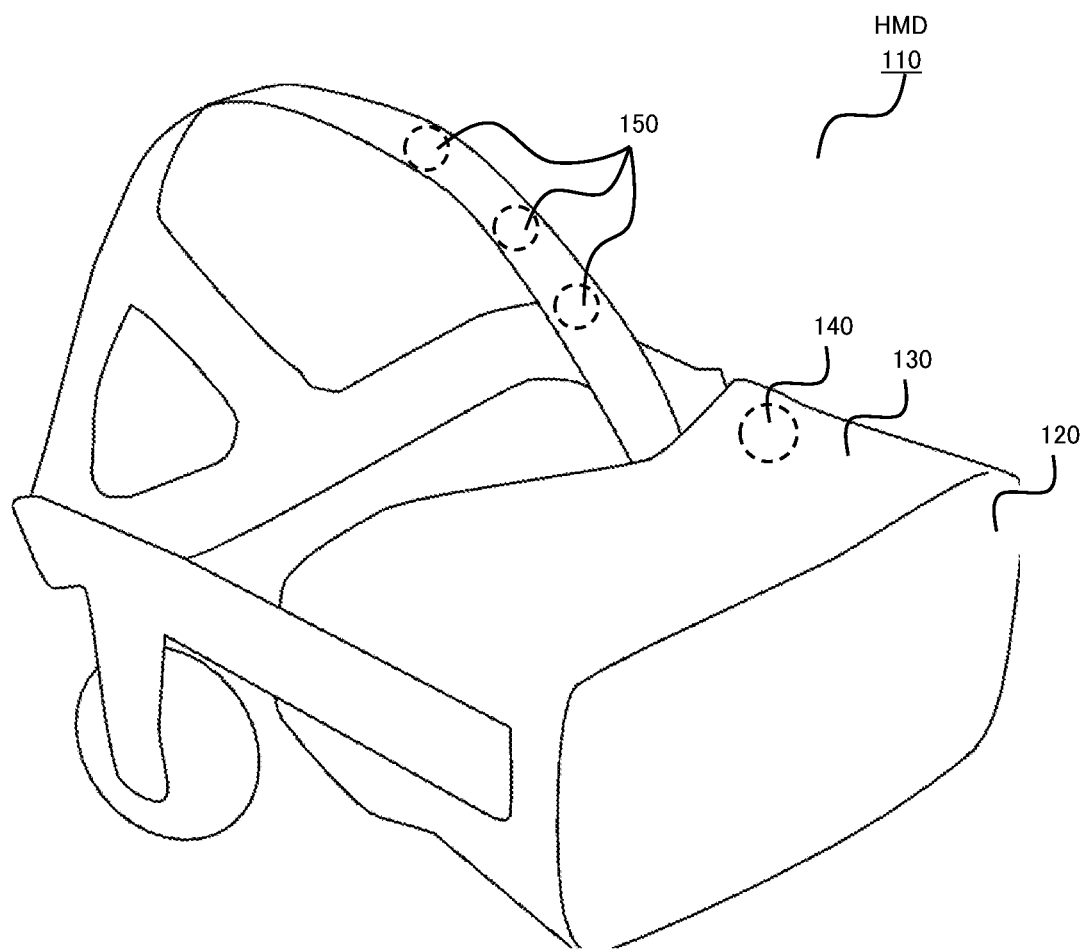
FIG. 3 shows a schematic view of the appearance of a head mount display (hereinafter referred to as an HMD) 110 according to the present embodiment.
Figure 5:
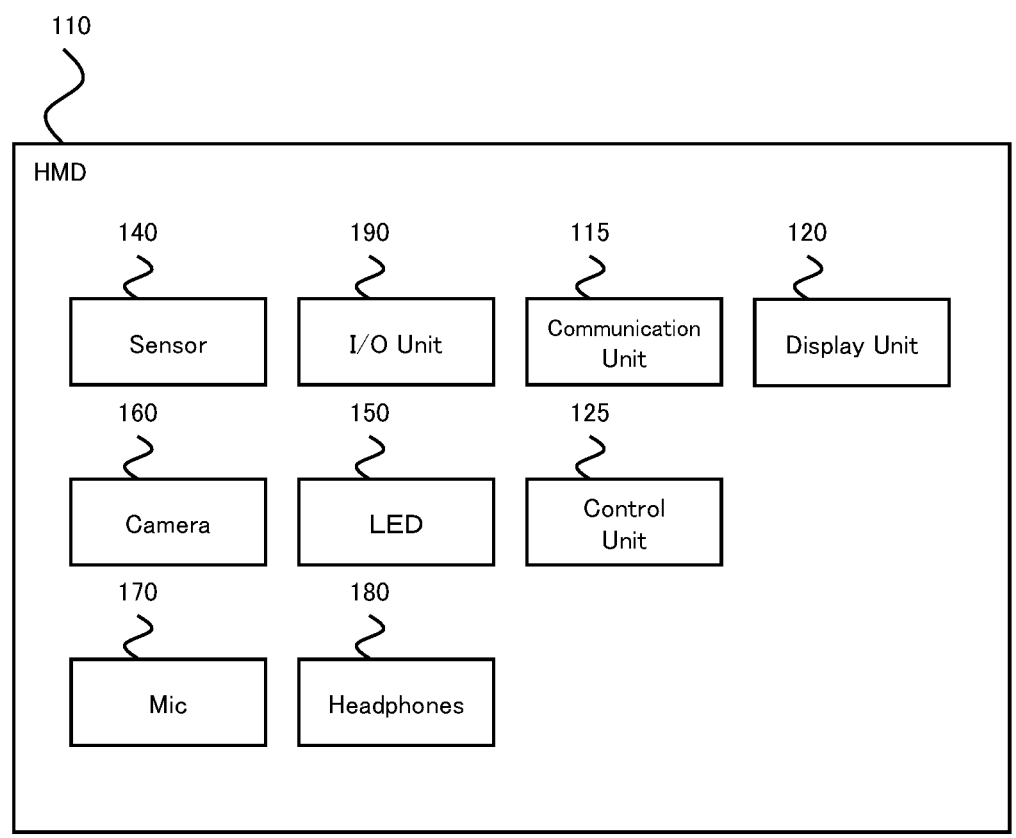
FIG. 5 shows a functional configuration diagram of the HMD 110 according to the present embodiment.

FIG. 3 shows a schematic view of the appearance of a head mount display (hereinafter referred to as HMD) 110 according to the present embodiment. FIG. 5 shows a functional configuration diagram of the HMD 110 according to the present embodiment. The HMD 110 is mounted on the user's head and includes a display panel 120 for placement in front of the user's left and right eyes. Although an optically transmissive and non-transmissive display is contemplated as the display panel, this embodiment illustrates a non-transmissive display panel that can provide more immersion. The display panel 120 displays a left-eye image and a right-eye image, which can provide the user with a three-dimensional image by utilizing the visual difference of both eyes. If left- and right-eye images can be displayed, a left-eye display and a right-eye display can be provided separately, and an integrated display for left-eye and right-eye can be provided.

The housing portion 130 of the HMD 110 includes a sensor 140. The sensor 140 may comprise, for example, a magnetic sensor, an acceleration sensor, or a gyro sensor, or a combination thereof, to detect actions such as the orientation or tilt of the user's head. When the vertical direction of the user's head is Y-axis, the axis corresponding to the user's anteroposterior direction is Z-axis, which connects the center of the display panel 120 with the user, and the axis corresponding to the user's left and right direction is X-axis, the sensor 140 can detect the rotation angle around the X-axis (so-called pitch angle), rotation angle around the Y-axis (so-called yaw angle), and rotation angle around the Z-axis (so-called roll angle).

In place of or in addition to the sensor 140, the housing portion 130 of the HMD 110 may also include a plurality of light sources 150 (e.g., infrared light LEDs, visible light LEDs). A camera (e.g., an infrared light camera, a visible light camera) installed outside the HMD 110 (e.g., indoor, etc.) can detect the position, orientation, and tilt of the HMD 110 in a particular space by detecting these light sources. Alternatively, for the same purpose, the HMD 110 may be provided with a camera for detecting a light source installed in the housing portion 130 of the HMD 110.

The housing portion 130 of the HMD 110 may also include an eye tracking sensor. The eye tracking sensor is used to detect the user's left and right eye gaze directions and gaze. There are various types of eye tracking sensors. For example, the position of reflected light on the cornea, which can be irradiated with infrared light that is weak in the left eye and right eye, is used as a reference point, the position of the pupil relative to the position of reflected light is used to detect the direction of the eye line, and the intersection point in the direction of the eye line in the left eye and right eye is used as a focus point.

Controller 210

Figure 4:
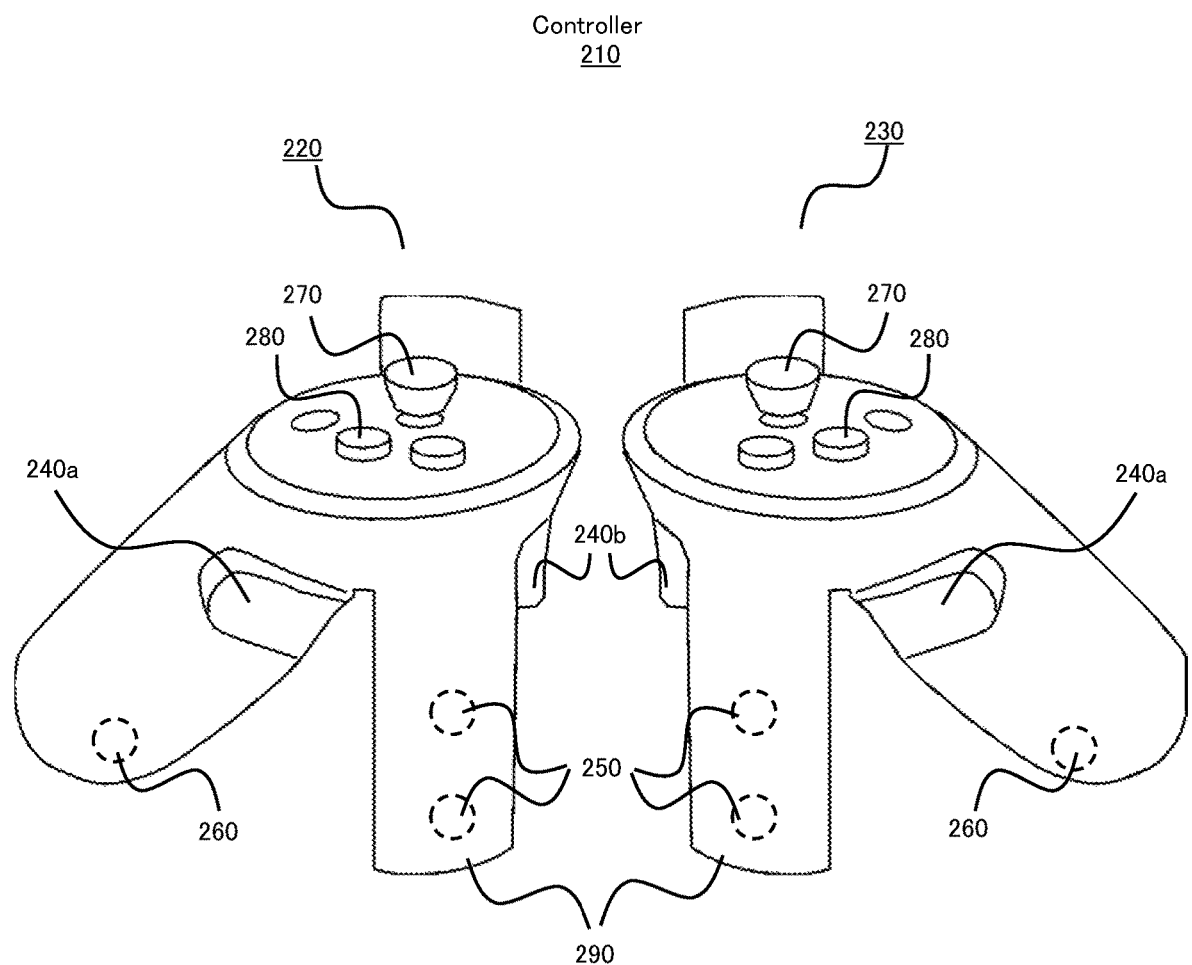
FIG. 4 shows a schematic view of the outside of the controller 210 according to the present embodiment.
Figure 6:
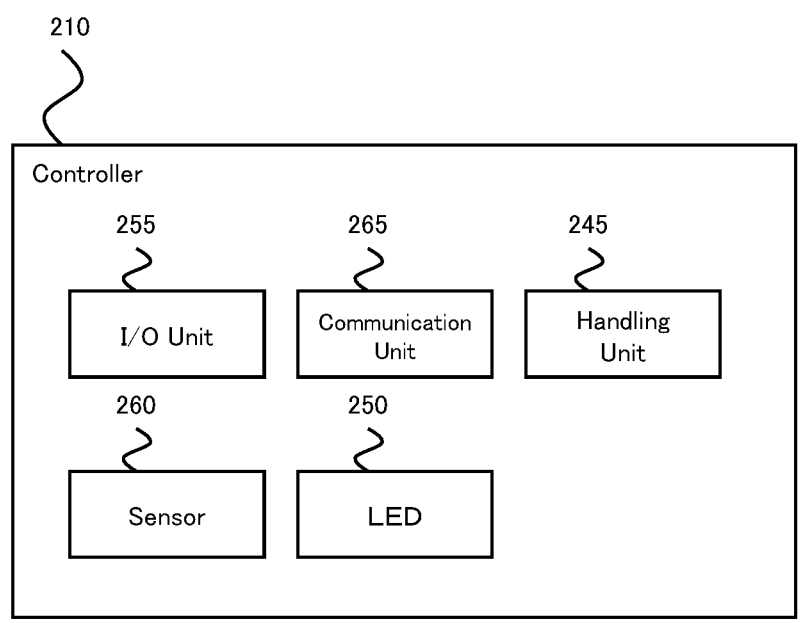
FIG. 6 shows a functional configuration diagram of the controller 210 according to the present embodiment.

FIG. 4 shows a schematic view of the appearance of the controller 210 according to the present embodiment. FIG. 6 shows a functional configuration diagram of the controller 210 according to the present embodiment. The controller 210 can support the user to make predetermined inputs in the virtual space. The controller 210 may be configured as a set of left-hand 220 and right-hand 230 controllers. The left hand controller 220 and the right hand controller 230 may each have an operational trigger button 240, an infrared LED 250, a sensor 260, a joystick 270, and a menu button 280.

The operation trigger button 240 is positioned as 240a, 240b in a position that is intended to perform an operation to pull the trigger with the middle finger and index finger when gripping the grip 235 of the controller 210. The frame 245 formed in a ring-like fashion downward from both sides of the controller 210 is provided with a plurality of infrared LEDs 250, and a camera (not shown) provided outside the controller can detect the position, orientation and slope of the controller 210 in a particular space by detecting the position of these infrared LEDs.

The controller 210 may also incorporate a sensor 260 to detect operations such as the orientation or tilt of the controller 210. As sensor 260, it may comprise, for example, a magnetic sensor, an acceleration sensor, or a gyro sensor, or a combination thereof. Additionally, the top surface of the controller 210 may include a joystick 270 and a menu button 280. It is envisioned that the joystick 270 may be moved in a 360 degree direction centered on the reference point and operated with a thumb when gripping the grip 235 of the controller 210. Menu buttons 280 are also assumed to be operated with the thumb. In addition, the controller 210 may include a vibrator (not shown) for providing vibration to the hand of the user operating the controller 210. The controller 210 includes an input/output unit and a communication unit for outputting information such as the position, orientation, and slope of the controller 210 via a button or a joystick, and for receiving information from the host computer.

With or without the user grasping the controller 210 and manipulating the various buttons and joysticks, and with information detected by the infrared LEDs and sensors, the system can determine the user's hand operation and attitude, pseudo-displaying and operating the user's hand in the virtual space.

Image Generator 310

Figure 7:
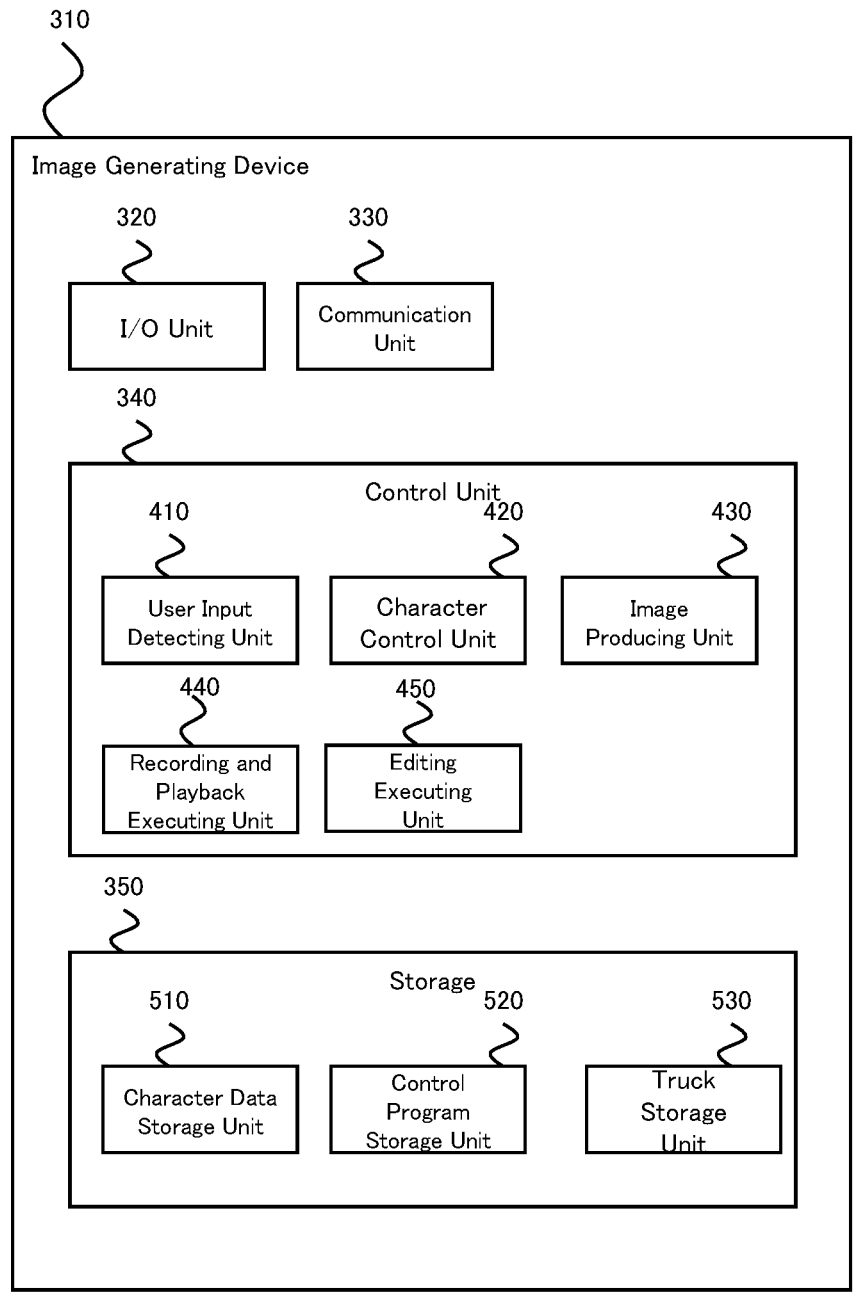
FIG. 7 shows a functional configuration diagram of an image producing device 310 according to the present embodiment.

FIG. 7 shows a functional configuration diagram of an image producing device 310 according to this embodiment. The image producing device 310 may use a device such as a PC, a game machine, or a portable communication terminal having a function for storing information on the user's head operation or the operation or operation of the controller acquired by the user input information or the sensor, which is transmitted from the HMD 110 or the controller 210, performing a predetermined computational processing, and generating an image. The image producing device 310 may include an input/output unit 320 for establishing a wired connection with a peripheral device such as, for example, an HMD 110 or a controller 210, and a communication unit 330 for establishing a wireless connection such as infrared, Bluetooth, or WiFi (registered trademark). The information received from the HMD 110 and/or the communication unit 330 regarding the operation of the user's head or the operation or operation of the controller is detected in the control unit 340 as input contents including the operation of the user's position, line of vision, attitude, speech, pronunciation, operation, etc., and a control program stored in the storage unit 350 is executed according to the user's input contents to perform a process such as controlling a character and generating an image. The control unit 340 may be composed of a CPU. However, by further providing a GPU specialized for image processing, information processing and image processing can be distributed and overall processing efficiency can be improved. The image generating device 310 may also communicate with other computing processing devices to allow other computing processing devices to share information processing and image processing.

The control unit 340 includes a user input detecting unit 410 that detects information received from the HMD 110 and/or the controller 210 regarding the operation of the user's head, speech and pronunciation, and operation of the controller, a character control unit 420 that executes a control program stored in the control program storage unit for a character stored in the character data storage unit 440 of the storage unit 350 in advance, and an image producing unit 430 that generates an image based on character control. Here, the control of the operation of the character is realized by converting information such as the direction, inclination, or manual operation of the user head detected through the HMD 110 or the controller 210 into the operation of each part of the bone structure created in accordance with the movement or restriction of the joints of the human body, and applying the operation of the bone structure to the previously stored character data by relating the bone structure. Further, the control unit 340 includes a recording and playback executing unit 440 for recording and playing back an image-generated character on a track, and an editing executing unit 450 for editing each track and generating the final content.

The storage unit 350 includes a character data storage unit 510 for storing not only image data of a character but also information related to a character such as attributes of a character. The control program storage unit 520 stores a program for controlling the operation of a character or an expression in the virtual space. The storage unit 350 includes a track storage unit 530 for storing action data composed of parameters for controlling the movement of a character in a dynamic image generated by the image producing unit 630.

Figure 8:
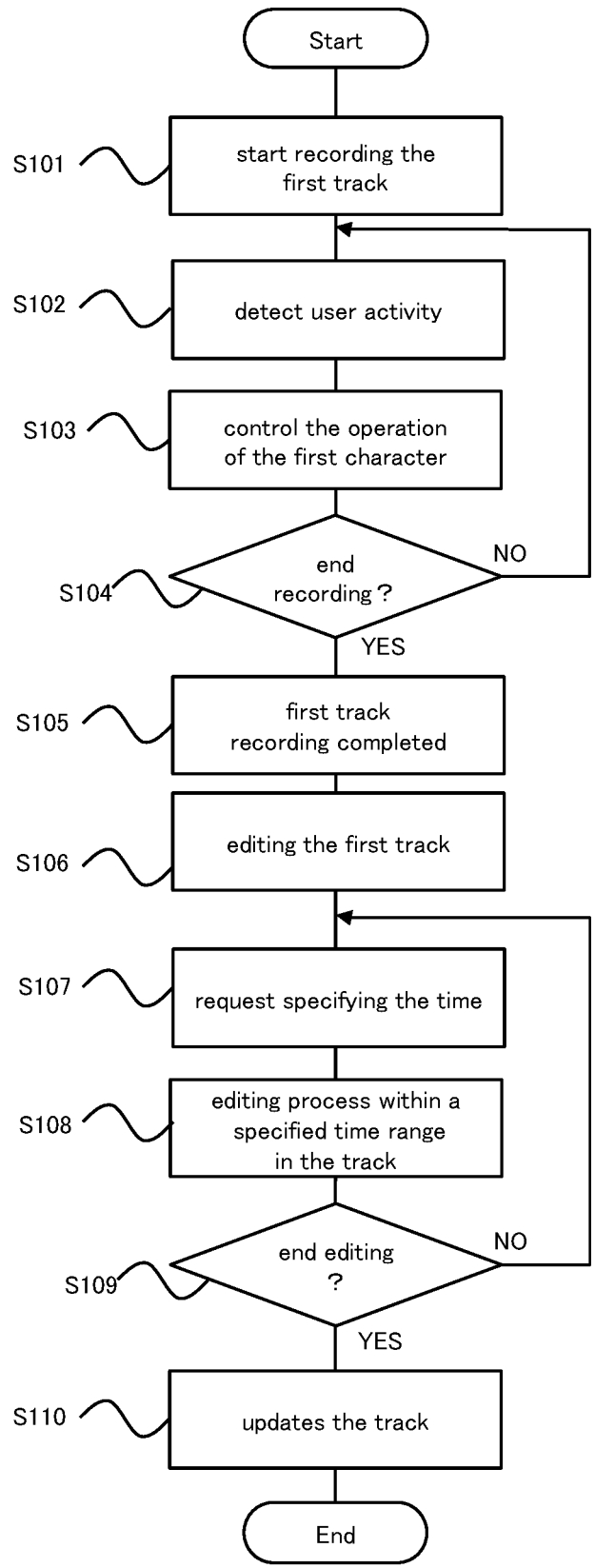
FIG. 8 is a flow chart illustrating an example of a track generation process according to an embodiment of the present invention.

FIG. 8 is a flowchart illustrating an example of a track generation process according to an embodiment of the present invention.

First, the recording and reproduction executing unit 440 of the control unit 340 of the image producing device 310 starts recording for storing action data of the moving image related to operation by the first character in the virtual space in the first track of the track storage unit 530 (S101). Here, the position of the camera where the character is to be shot and the viewpoint of the camera (e.g., FPV, TPV, etc.) can be set. For example, in the virtual space 1 illustrated in FIG. 1, the position where the camera man 2 is disposed and the angle of the camera 3 can be set with respect to the character 4 corresponding to the first character. The recording start operation may be indicated by a remote controller, such as controller 210, or may be indicated by other terminals. The operation may also be performed by a user who is equipped with an HMD 110 to manipulate the controller 210, to play a character, or by a user other than the user who performs the character. In addition, the recording process may be automatically started based on detecting an operation by a user who performs the character described below.

Subsequently, the user input detecting unit 410 of the control unit 340 detects information received from the HMD 110 and/or the controller 210 relating to the operation of the user's head, speech or pronunciation of the user, and operation or operation of the controller (S102). For example, when the user mounting the HMD 110 tilts the head, the sensor 140 provided in the HMD 110 detects the tilt and transmits information about the tilt to the image generating device 310. The image generating device 310 receives information about the operation of the user through the communication unit 330, and the user input detecting unit 410 detects the operation of the user's head based on the received information. Also, when a user performs a predetermined operation or operation, such as lifting the controller 210 or pressing a button, the sensor 260 provided in the controller detects the operation and/or operation and transmits information about the operation and/or operation to the image generating device 310 using the controller 210. The image producing device 310 receives information related to the user's controller operation and operation through the communication unit 330, and the user input detecting unit 410 detects the user's controller operation and operation based on the received information.

Subsequently, the character control unit 420 of the control unit 340 controls the operation of the first character in the virtual space based on the operation of the detected user (S103). For example, based on the user detecting an operation to tilt the head, the character control unit 420 controls to tilt the head of the first character. Also, based on the fact that the user lifts the controller and detects pressing a predetermined button on the controller, the character control unit 420 controls something while extending the arm of the first character upward. In this manner, the character control unit 420 controls the first character to perform the corresponding operation each time the user input detecting unit 410 detects an operation by a user transmitted from the HMD 110 or the controller 210. Stores parameters related to the operation and/or operation detected by the user input detecting unit 410 in the first track of the track storage unit 530. Alternatively, the character may be controlled to perform a predetermined performance action without user input, the action data relating to the predetermined performance action may be stored in the first track, or both user action and action data relating to the predetermined behavior may be stored.

Subsequently, the recording and reproduction executing unit 440 confirms whether or not the user receives the instruction to end the recording (S104), and when receiving the instruction to end the recording, completes the recording of the first track related to the first character (S105). The recording and reproduction executing unit 440 continues the recording process unless the user receives an instruction to end the recording. Here, the recording and reproduction executing unit 440 may perform the process of automatically completing the recording when the operation by the user acting as a character is no longer detected. It is also possible to execute the recording termination process at a predetermined time by activating a timer rather than accepting instructions from the user.

Figure 9:
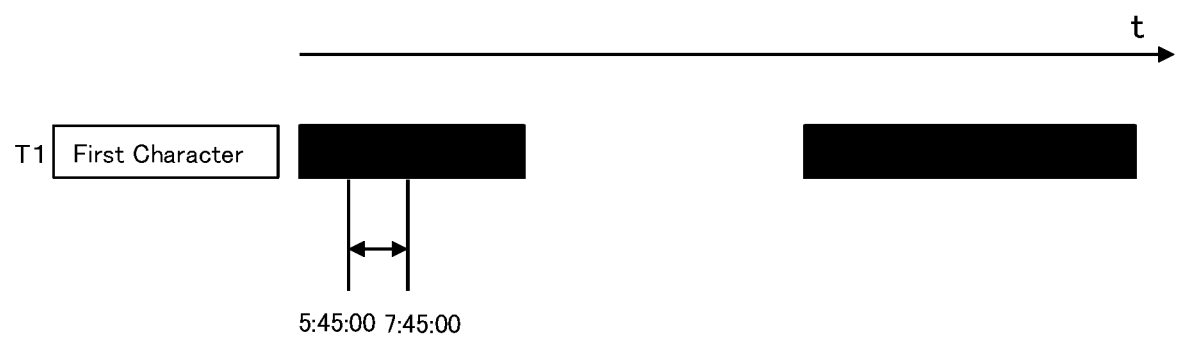
FIG. 9 is a diagram illustrating an example of a user interface for editing a track according to an embodiment of the present invention.

Subsequently, the editing execution unit 450 of the control unit 340 of the image generating device 310 performs a process of editing the first track stored in the track storage unit 530 based on a user's request (S106). For example, the user edits a first track (T1) associated with the first character via a user interface for track editing, as shown in FIG. 9. For example, the user interface displays the area in which the first track is stored along a time series. The user selects a desired bar so that the 3D model of the character is rendered based on the parameters and character data of the stored moving image, and the moving image of the character (e.g., the character 4) disposed in the virtual space as shown in FIG. 1 is reproduced. It should be noted that as a user interface for editing tracks, it is also possible to display, for example, a track name and title (e.g., a "first character") in a list format, in addition to the display described above. Alternatively, the user interface may allow editing to be performed while the moving image of the character is played directly, or a keyframe of the moving image may be displayed in which the user selects the keyframe to be edited, without showing the tracks or lists as shown in FIG. 9. In addition, among the 3D characters displayed as a dynamic image, it is possible to perform a process such as changing the color of the character selected as an editing target by the selected time.

Subsequently, the user input detecting unit 410 of the control unit 340 receives a request specifying the time that the user wishes to edit for the track to be edited (S107). For example, in a user interface as illustrated in FIG. 9, the user may perform an operation to specify the time zone (e.g., 5 minutes 45 seconds to 7 minutes 45 seconds) within the bar (T1) displayed along a time series, or may specify a time in the playback screen while checking the character operation to be played based on the movable image or action data of the character.

Subsequently, the edit executing unit 450 of the control unit 340 of the image producing device 310 performs a predetermined editing process within a specified time range in the track (S108). An editing process includes, for example, recoding a character operation. Here, as described above, the character control unit 420 of the control unit 340 controls the operation of the first character in the virtual space based on the operation of the detected user, and stores the parameters related to the operation and/or operation detected by the user input detecting unit 410 in the first track of the track storage unit 530. Alternatively, the character may be controlled to perform a predetermined performance action without user input, the action data relating to the predetermined performance action may be stored in the first track, or both user action and action data relating to the predetermined behavior may be stored.

Subsequently, the recording and reproduction executing unit 440 checks whether the user receives the instruction to terminate the editing (S109). When the instruction to terminate the editing is received, the recording and reproduction executing unit 440 completes the editing of the first track related to the first character and updates the track (S110). Here, in the example of a recording, the recording and reproduction executing unit 440 continues the recording process unless the user receives an instruction to end the recording. Here, the recording and reproduction executing unit 440 may perform the process of automatically completing the recording when the operation by the user acting as a character is no longer detected. In the present embodiment, since the time zone is specified in advance as described above, it is possible to execute the process of ending recording at a predetermined time by activating a timer rather than accepting instructions from the user.

As described above, by applying the method of multitrack recording (MTR) to the animation production according to the present embodiment, the character operation linked to the user operation can be stored in each track, and the editing operation can be performed while the time is specified in each track. Therefore, it is possible to improve the efficiency of the animation production.

Although the present embodiment has been described above, the above-described embodiment is intended to facilitate the understanding of the present invention and is not intended to be a limiting interpretation of the present invention. The present invention may be modified and improved without departing from the spirit thereof, and the present invention also includes its equivalent.

For example, in this embodiment, while a character has been described as an example with respect to a track generation method and an editing method, the method disclosed in this embodiment may be applied not only to a character, but also to an object including a character (vehicle, structure, article, etc.) with an action.

For example, although the image producing device 310 has been described in this embodiment as separate from the HMD 110, the HMD 110 may include all or part of the configuration and functions provided by the image producing device 310.

EXPLANATION OF SYMBOLS 1 virtual space
2 cameraman
3 cameras 4 characters
5 characters
110 HMD
210 controller
310 Image Generator

The invention claimed is:

1. An animation production method for providing a virtual space in which a character is placed, the method comprising:

detecting first sequential actions of a user equipped with a head mounted display;

controlling first sequential movements of the character aligned with the first sequential actions of the user;

shooting the first sequential movements of the character; and storing first action data relating to the first sequential movements of the shot character in a predetermined track;

accepting an editing request for the predetermined track;

accepting specified time range of the predetermined track for editing; and editing at the specified time range by controlling second sequential movements of the character by second sequential actions of the user and storing second action data over the first action data, the second action data relating to the second sequential movements of the character.

2. The method according to claim 1, wherein the character is a first character, the predetermined track is a first track, the method further comprising:

detecting third sequential actions of the user mounting the head mounted display;

controlling third sequential movements of a second character based on the detected third sequential actions of the user;

shooting the third movements of the second character; and storing third action data of the second character in a second track, wherein the virtual space comprises images relating to movement of the character corresponding to the second and third action data stored in the first track and the second track respectively.

* * * * *